(12) United States Patent
Armstrong-Crews et al.

(10) Patent No.: US 7,216,207 B1
(45) Date of Patent: May 8, 2007

(54) SYSTEM AND METHOD FOR FAST, SECURE REMOVAL OF OBJECTS FROM DISK STORAGE

(75) Inventors: Nicholas Lloyd Armstrong-Crews, Aurora, CO (US); Lawrence Yiumchee Chiu, Cupertino, CA (US); Patrick John Cozzi, Drexel Hill, PA (US); Patrick Randolph Eaton, Lafayette, CA (US); Prasenjit Sarkar, San Jose, CA (US); Krishnakumar Surugucchi, Fremont, CA (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 10/795,648

(22) Filed: Mar. 8, 2004

(51) Int. Cl.
*G06F 12/12* (2006.01)
*G06F 12/14* (2006.01)

(52) U.S. Cl. .................. 711/159; 711/163; 726/26

(58) Field of Classification Search ............... None
See application file for complete search history.

(56) References Cited

U.S. PATENT DOCUMENTS

| | | | | |
|---|---|---|---|---|
| 4,965,828 A * | 10/1990 | Ergott et al. | ............. | 713/193 |
| 5,893,120 A * | 4/1999 | Nemes | ............. | 707/206 |
| 6,134,660 A * | 10/2000 | Boneh et al. | ............. | 713/193 |
| 6,324,676 B1 * | 11/2001 | Burnham et al. | ............. | 716/16 |
| 6,609,176 B1 | 8/2003 | Mizuno | | |
| 2002/0083081 A1 * | 6/2002 | Chen et al. | ............. | 707/200 |
| 2002/0110353 A1 | 8/2002 | Potrebic et al. | | |
| 2003/0115263 A1 * | 6/2003 | Tran et al. | ............. | 709/203 |
| 2003/0182566 A1 * | 9/2003 | Kohara et al. | ............. | 713/193 |
| 2004/0205088 A1 * | 10/2004 | Toner | ............. | 707/200 |

FOREIGN PATENT DOCUMENTS

JP    92000000195895    1/2002

OTHER PUBLICATIONS

Joel L. Wolf, Philip S. Yu, Hadas Shachnai, "DASD Dancing: A Disk Load Balancing Optimization Scheme for Video-on-Demand Computer Systems", 1995 Sigmetrics, pp. 157-166.
"Location zero reference detection mechanism", IBM Research Disclosure 449131, Sep. 2001, 1 page.

* cited by examiner

*Primary Examiner*—Pierre Bataille
*Assistant Examiner*—Michael Krofcheck
(74) *Attorney, Agent, or Firm*—Gibb I.P. Law Firm, LLC; Marc McSwain, Esq.

(57) ABSTRACT

A system, program storage device, and method of optimizing data placement on a storage device, the method comprising establishing a specified time constraint for which the storage device is to delete data stored thereon; dividing a data object into a plurality of data bits; programming a block of data and the data bits with a logic operand if the storage device is incapable of deleting the data within the specified time constraint; creating an encoded block of data from the programmed block of data and the data bits; organizing the encoded block of data and the data bits in the storage device according to data deletion requirements; and removing the data bits from the storage device if the data bits are organized within a specified data deletion requirement, wherein the data bits are removed using a data shredding process, and wherein the logic operand comprises an exclusive-or (XOR) operator.

21 Claims, 5 Drawing Sheets

SYSTEM AND METHOD FOR FAST, SECURE REMOVAL OF OBJECTS FROM DISK STORAGE

BACKGROUND OF THE INVENTION

1. Field of the Invention

The invention generally relates to computer storage systems and methods of storage retrieval, and more particularly to a system and method for quickly and securely deleting an object from a rewriteable storage device.

2. Description of the Related Art

Data that is written once and seldom retrieved is classified as "Reference Data". The growth of reference data is increasing at a faster rate than traditional customer data like on-line transaction processing (OLTP) data. In reference storage systems, the customers specify an expiration date for their data. The reference storage system has to ensure that this data cannot be accidentally removed and that the data is physically removed from the storage media after the expiration date. For example, many companies prefer to delete regulatory documents immediately after the government regulated mandatory retention time period.

Reference data can be stored on write-once (WORM) media like DVDs or WORM-tapes, or it can also be stored on non-WORM media like disks and tapes. Physical deletion of data on WORM media usually amounts to the physical destruction of the DVDs or CDs, whereas, physical deletion of data on non-WORM media requires the storage system to over-write the existing data multiple times with random data.

When customers have large amounts of data, the physical deletion of data after the expiration date can take many hours/days (depending upon the amount of data). In many traditional storage systems, when a user requests that an object be deleted from storage, the computer system marks that the space storing the object may be reused, but actually the computer system does not really remove the bits from the media. An investigator or malicious user can use special tools to retrieve data that has been marked for deletion but not yet overwritten. This is a liability for users with sensitive or valuable data.

To guard against the disclosure of data after it has been deleted, the Department of Defense has developed a standard to ensure that detected data is actually unrecoverable. The standard requires that storage used to record data be overwritten when the data is deleted, not simply marked for reclamation. In fact, to ensure that the storage does not contain the magnetic signature of the original data, the standard requires that the storage be overwritten multiple times. While this ensures that the data is securely removed, the cost of removing data is several times the cost of writing data normally.

Another conventional approach is to interleave a file's blocks with one another. Then, securely deleting a subset of the blocks of storage actually destroys data from throughout the file. The problem with this approach is that the rest of the file remains readable. This could allow investigators or malicious users to extract valuable information from the remnants of the data that remain.

However, due to the drawbacks and limitations of the conventional systems and methods there remains a need for a system and method for quickly and securely deleting an object from a rewriteable storage device.

SUMMARY OF THE INVENTION

In view of the foregoing, an embodiment of the invention provides a program storage device and a method of optimizing data placement on a storage device, the method comprising establishing a specified time constraint for which the storage device is to delete data stored thereon; dividing a data object into a plurality of data bits; programming a block of data and the data bits with a logic operand, if the storage device is incapable of deleting the data within the specified time constraint; creating an encoded block of data from the programmed block of data and the data bits; organizing the encoded block of data and the data bits in the storage device according to data deletion requirements; and removing the data bits from the storage device if the data bits are organized within a specified data deletion requirement, wherein the data bits are removed using a data shredding process, and wherein the logic operand comprises an exclusive-or (XOR) operator. The method further comprises restoring the data object by retrieving the encoded block of data and the data bits from the storage device; applying the logic operand to the encoded block of data and the data bits; associating a piece of metadata with the object to identify a correct block of data to be used to form the encoded block of data; using idle cycles to rearrange the encoded block of data and the data bits prior to the step of removing; determining whether the data deletion requirements can be satisfied; and informing a user whether the data deletion requirements cannot be satisfied.

According to another embodiment, the invention provides a storage device comprising an encoded block of data comprising a block of data and data bits; a data organizer operable for organizing the encoded block of data according to data deletion requirements; and a data deletion component operable for removing the data bits from the storage device if the data bits are organized within a specified data deletion requirement, wherein the data deletion component removes the data bits using a data shredding process, wherein the logic operand comprises an exclusive-or (XOR) operator, wherein the data organizer is operable for determining whether the data deletion requirements can be satisfied, and wherein the data organizer is operable for informing a user whether the data deletion requirements cannot be satisfied. The storage device further comprises a data restoration component.

The invention achieves several advantages. The invention quickens the physical deletion of data in the following novel ways. Data objects are placed on disk systems to optimize read or write performance. For example, data is stripped across multiple disks (e.g., RAID 0) to improve read performance times. Generally, when data is initially stored, it is stored to improve READ performance. Subsequently, the data is moved and re-allocated on the disk to speed up delete performance. When this occurs is determined based on the data expiration policy. Thus, when data is stored initially, it is not optimized for delete performance. Only after the invention is applied to the stored data, is the data optimized for delete performance. Another feature of the invention is that encrypting the data using a key (salt) is only necessary when the system determines that it cannot delete the data within the prescribed time period. Hence, one does not have to encrypt the data using the salt all the time this is an important point.

According to the invention data is placed on disks to optimize delete performance. Delete performance is optimized both for user's data as well as the metadata that describes the place of the user's data on the disk. The system constantly monitors user's data creation rate, and it proactively warns the user if it cannot delete data within the user specified tolerance window. For example, users might want all of their data to be physically removed from the disk within twenty-four hours of the expiration of the data retention time. The system places data to optimize read performance, but subsequently, it dynamically re-organizes the data to optimize delete performance when it gets closer to the data expiration time. If the data cannot be physically deleted in the user desired time window, then the system provides the user with an option to encrypt the data so that the data can be logically deleted upon the expiration of the data retention time, and then subsequently physically removed in a so-called "lazy" manner.

These, and other aspects and advantages of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
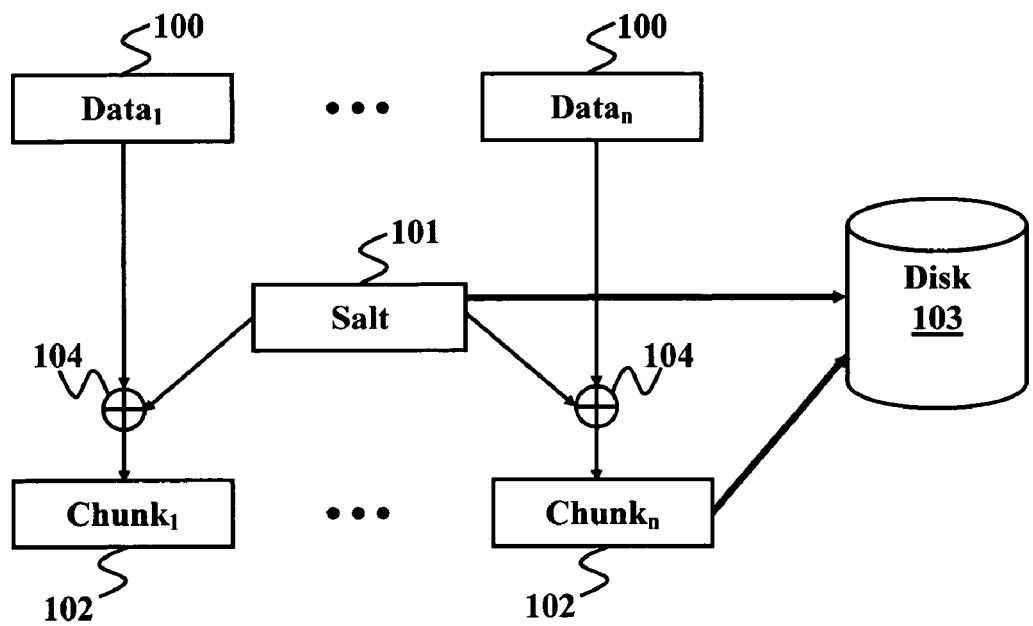
FIG. 1 is a system block diagram according to an embodiment of the invention.

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

Figure 2:
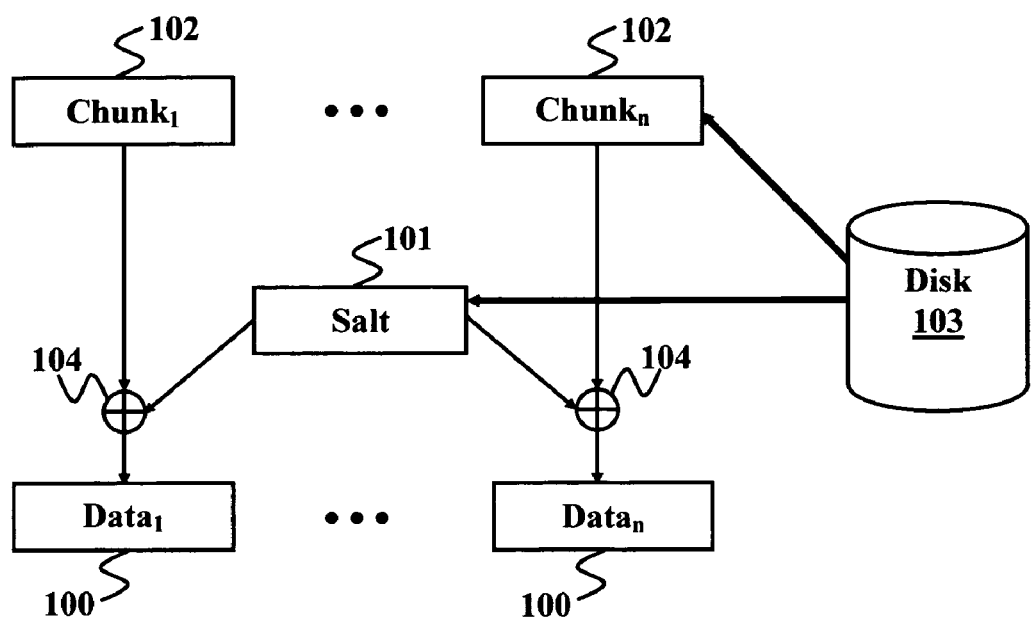
FIG. 2 is a system diagram illustrating an alternative embodiment of the invention.

As mentioned, there is a need for a system and method for quickly and securely deleting an object from a rewriteable storage device. Referring now to the drawings and more particularly to FIGS. 1 through 6, there are shown preferred embodiments of the invention. The process of encoding data 100 for storage on a disk 103 is shown in FIG. 1. The process of encoding data 100 occurs if the storage device 103 is incapable of deleting the data 100 within a specified time constraint (for example, a few seconds, minutes, days, months, years, etc.). According to the invention, for each object stored, the system uses a secure random generator (not shown) to create a block of 'salt' 101. The object may comprise any data format such as text data, audio data, and/or image data. The block of salt 101, which is embodied as a bit of data, is stored on the storage device. The system divides the object to be stored into a number of data blocks 100 no larger than the size of the block of salt 101. Each block of data 100 is programmed with an exclusive-or (XOR) operator 104 and with the block of salt 101 thereby producing an encoded block or chunk 102 of data. The block of salt 101 is smaller than the chunk 102. The chunks 102 of the object are then stored on the storage device (disk) 103 along with the block of salt 101, as illustrated in FIG. 1. To read the object, the system retrieves the object's block of salt 101 and all of its chunks 102. Applying the XOR operator 104 to the encoded blocks 102 and the block of salt 101, the original data 100 is retrieved. The process of reconstructing the data 100 for reading is shown in FIG. 2.

Because the object cannot be read without the block of salt 101 to decode the encoded blocks 102, to securely delete the data 100, the system only needs to securely remove the block of salt 100, a single block, from the storage device 103. The block of salt 100 is removed through a process of data shredding, wherein the data 100 is overwritten several times.

The approach provided by the invention allows objects of any size to be securely deleted at the cost of securely removing only a single block from the storage device 103. The invention also provides an additional layer of encryption further protecting the data from users or tools trying to access the data through out-of-band means (data is not available in plain text even if users or applications do not use any form of encryption). In other words, if one encrypts data 100 on the disk 103, then even if the disk 103 is stolen and accessed (out-of-band access) then the data 100 will still be unreadable. Thus, the encryption prevents out-of-band access.

The invention functions by creating a dependence of every byte of data in a file or object on a single block of data. No portion of the data 100 can be recovered without the block of salt 101. Moreover, the invention can be implemented in a number of file systems or integrated storage solutions. To implement the invention, one simply needs to associate an additional piece of metadata with each file or object to identify the block of salt 101 to be used to encode and decode chunks 102 of the object. The block of salt 101 can be stored on the same storage device 103 as the metadata and data blocks 100.

Furthermore, the invention can be combined with several other techniques to ensure that valuable or sensitive data is deleted in an unrecoverable manner. This occurs as follows. First, a low-priority background process is preferably employed to securely remove a file's chunks 102 after the block of salt 101 has been removed. The data 100 cannot be read without the block of salt 101. However, even after removing the salt 101 from the system, an attacker could collect the encoded blocks 102 of data and try to reconstruct the block of salt 101. However, using idle cycles to remove the chunks 102 from a disk 103 further mitigates the risk of discovery. An idle cycle means that this task of block deletion is performed in low priority mode. That is, highest priority is given to normal read/write tasks, and data deletion tasks are given a lower priority.

Finally, some data 100 could be considered so valuable that the process of removing the salt 101 immediately and allowing the background process to remove the encoded chunks 102 is performed in conjunction with a second process of removal. In such cases, a user, administrator, or application may elect to optimize the system for security instead of throughput. In a system optimized for security, all blocks belonging to a file are shredded immediately. To minimize the cost of this operation, a low-priority background process can use idle cycles to rearrange blocks belonging to objects that will be deleted in the near future so that they can be overwritten at maximum throughput. For a single disk system, the blocks would be allocated consecutively on the disk; for a multi-disk system, the blocks would be striped across the disks to take advantage of the aggregate bandwidth of the disks.

Figure 3:
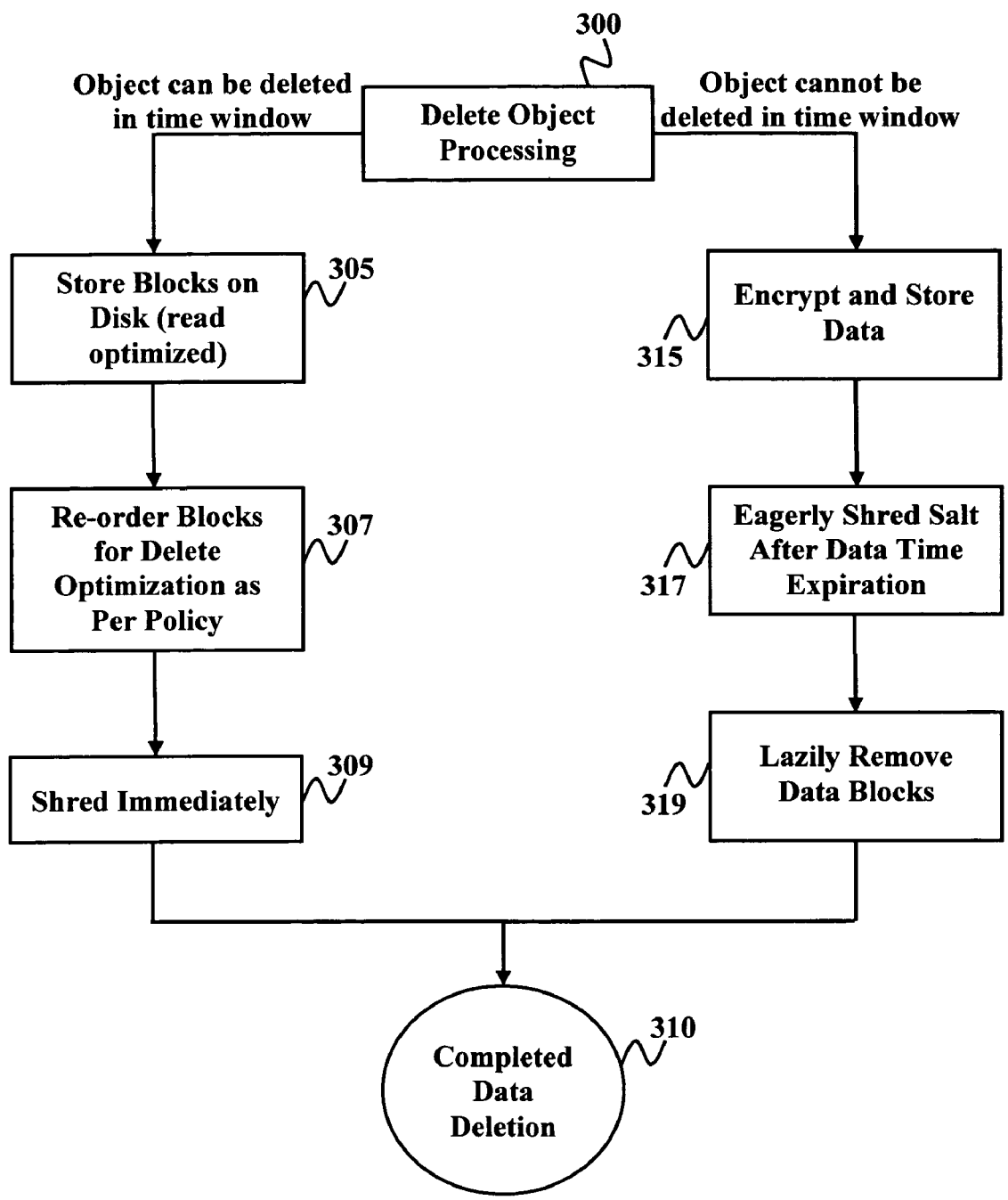
FIG. 3 is a flow block diagram according to an embodiment of the invention.

FIG. 3 illustrates the deletion process under two scenarios: (1) the object can be deleted within the user-specified time window and (2) the object cannot be deleted within the user-specified time window. As shown in FIG. 3, the deletion process begins 300 by the determination of whether the object can or cannot be deleted within the user-specified time window. If the object can be deleted within the time window, then the blocks are stored 305 on the disk 103 (read optimized). Then, the blocks are re-ordered 307 for delete optimization as per the deletion time constraint policy established by the user. Then, the data 100 is immediately shredded 309. This completes 310 the data deletion process under the first scenario. If the object cannot be deleted within the time window, then the data 100 is encrypted and stored 315. Next, the invention eagerly shreds 317 the salt 101 after the data time window has expired. Then, the data blocks are lazily removed 319. According to the second scenario, the data deletion process is now completed 310.

Figure 4:
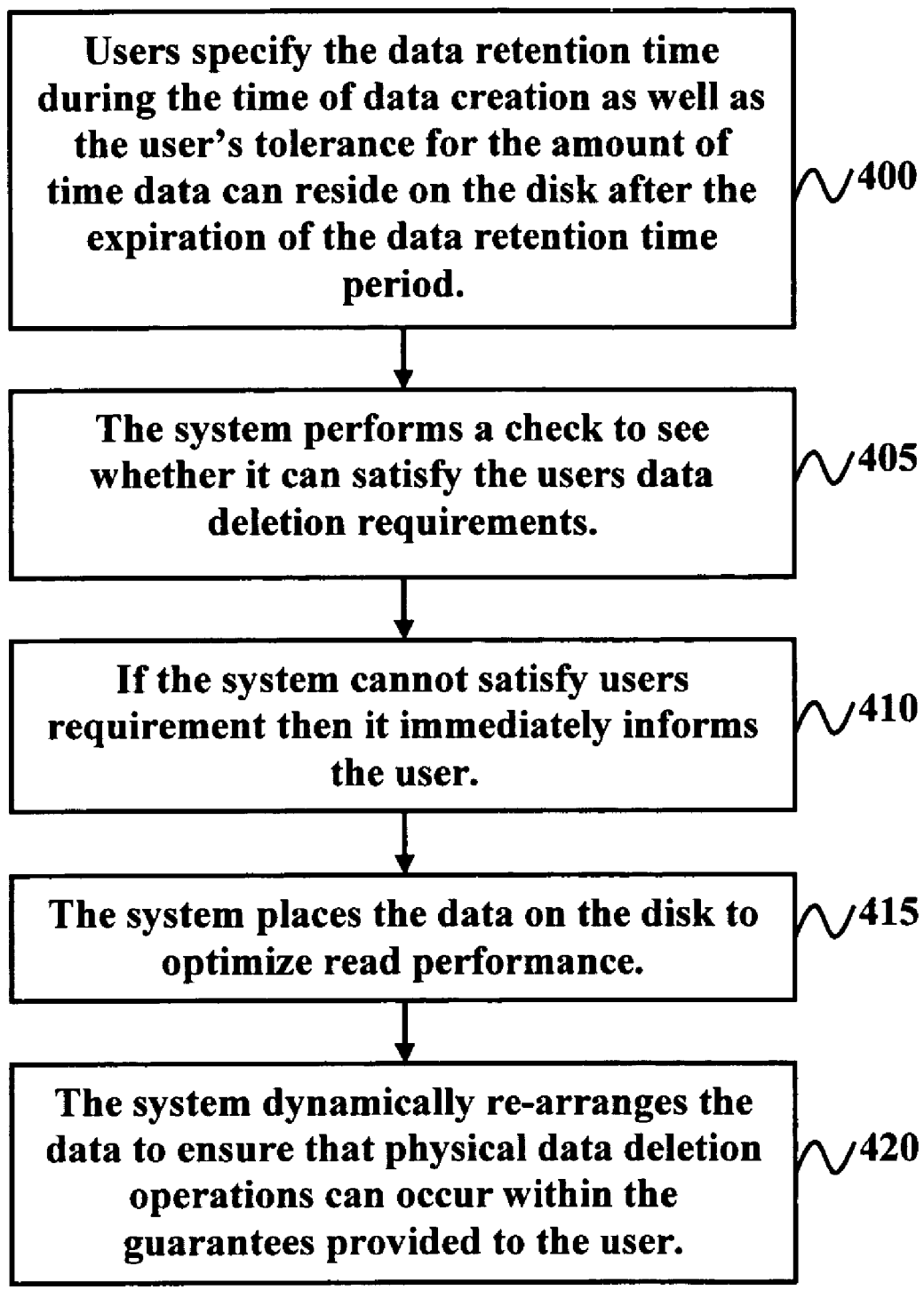
FIG. 4 is a flow diagram illustrating a preferred embodiment of the invention.

Generally, the invention comprises the following steps, which are further described in the flow diagram of FIG. 4. First, users specify 400 the data retention time during the time of data creation. The users also specify their tolerance for the amount of time data can reside on the disk after the expiration of the data retention time period. The system then performs 405 a check to see whether it can satisfy the users data deletion requirements. If the system cannot satisfy users requirement then it immediately informs 410 the user. Thereafter, the system places 415 the data on the disk to optimize read performance. This is significant because government audits mandate that the data be retrieved from the disks within a narrow time window. Subsequently, the system dynamically re-arranges 420 the data to ensure that physical data deletion operations can occur within the guarantees provided to the user.

In other words, the invention provides a method of optimizing data placement on a storage device, the method comprising establishing a specified time constraint for which the storage device is to delete data; dividing a data object into a plurality of data bits; programming a block of data and the data bits with a logic operand if the storage device is incapable of deleting the data within the specified time constraint; creating an encoded block of data from the programmed block of data and the data bits; organizing the encoded block of data and the data bits in the storage device according to data deletion requirements; and removing the data bits from the storage device if the data bits are organized within a specified data deletion requirement, wherein the data bits are removed using a data shredding process, and wherein the logic operand comprises an exclusive-or (XOR) operator. The method further comprises restoring the data object by retrieving the encoded block of data and the data bits from the storage device; applying the logic operand to the encoded block of data and the data bits; associating a piece of metadata with the object to identify a correct block of data to be used to form the encoded block of data; using idle cycles to rearrange the encoded block of data and the data bits prior to the step of removing; determining whether the data deletion requirements can be satisfied; and informing a user whether the data deletion requirements cannot be satisfied.

Figure 5:
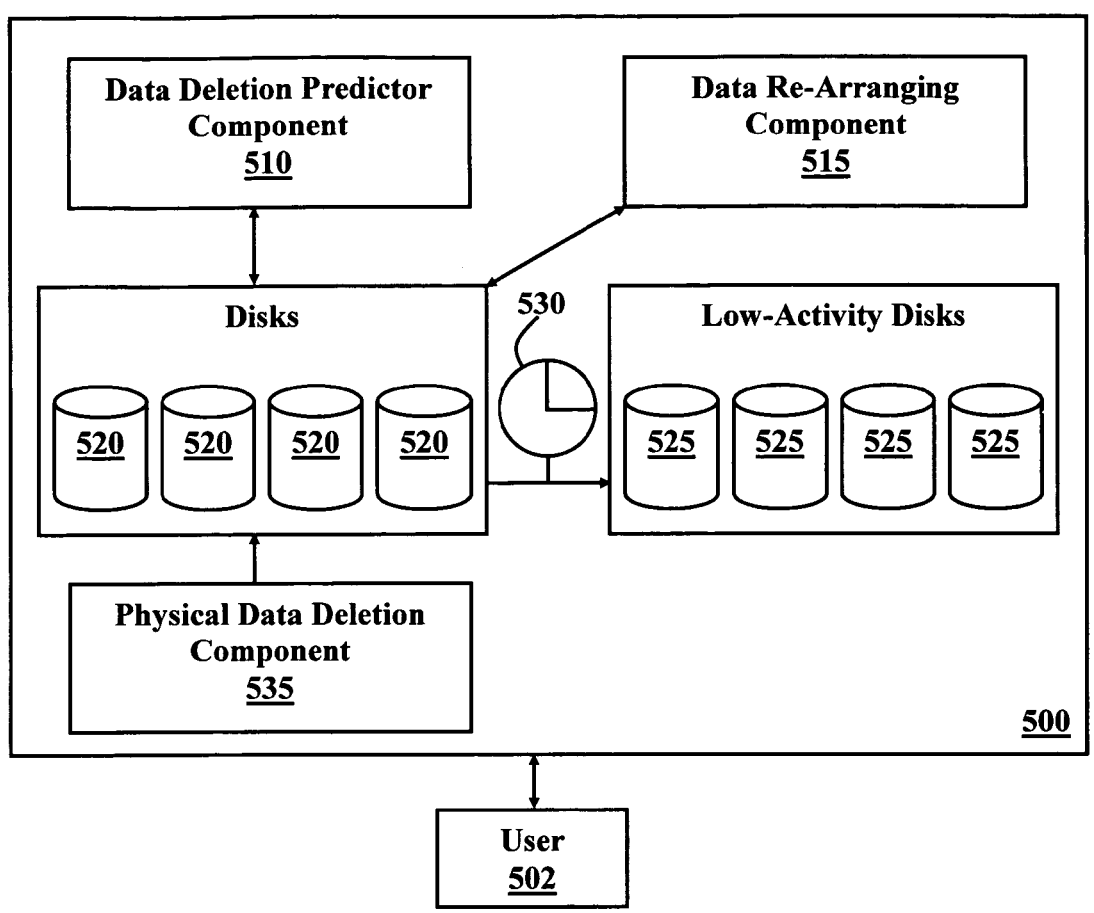
FIG. 5 is a system diagram according to a preferred embodiment of the invention.

As shown in FIG. 5, the invention comprises a system 500 comprising a data deletion predictor component 510, which looks at the current state of the system 500 with respect to the number of objects and their physical deletion dates, the network speed, disk speeds, current normal I/O rate to determine whether data can be deleted as per the user requirements. If data cannot be physically deleted as per users wishes then the system 500 informs the user 502 as such. The system 500 allows the users to encrypt their data, so that the data can be logically deleted upon the expiration of data retention time, and subsequently physically deleted in a so-called "lazy" manner. A "lazy" manner means that the data will be deleted using a low priority background manner. The low priority process becomes active when there are no higher priority (normal read and write) tasks to be performed.

The system 500 also comprises a data re-arranging component 515. The system 500 initially places the data on the disks 520 to optimize for read performance. However, when the data expiration time comes closer, as determined by timer 530, then the system 500 re-organizes the data on the disks 520 to reduce the data deletion time period. Data is moved to low activity disks 525 so that when the data is being deleted, there is not much interference from other disk I/O traffic. Data is also re-organized on tracks to amortize disk seek and rotational delay times. The system further comprises a physical data deletion component 535, which physically writes random characters on the disk 520 to erase previously existing data content. Generally, the system embodiment of the invention provides a storage device comprising an encoded block of data comprising a block of data and data bits; a data organizer operable for organizing the encoded block of data according to data deletion requirements; and a data deletion component operable for removing the data bits from the storage device if the data bits are organized within a specified data deletion requirement.

Figure 6:
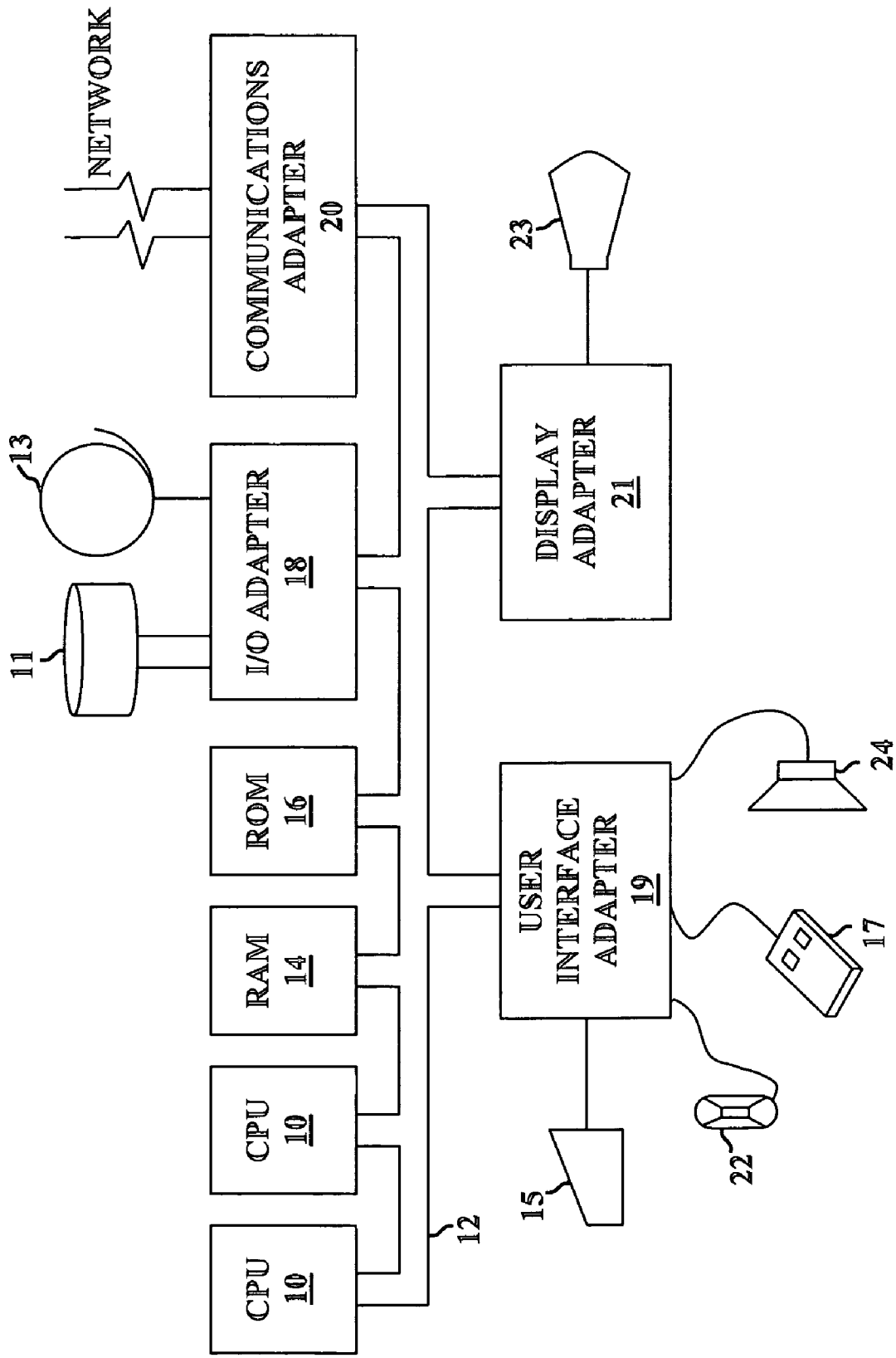
FIG. 6 is a computer system diagram according to a preferred embodiment of the invention.

A representative hardware environment for practicing the present invention is depicted in FIG. 6, which illustrates a typical hardware configuration of an information handling/computer system in accordance with the invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 24, microphone 22, and/or other user interface devices such as a touch screen device (not shown) to bus 12, communication adapter 20 for connecting the information handling system to a data processing network, and display adapter 21 for connecting bus 12 to display device 23. A program storage device readable by the disk or tape units is used to load the instructions, which operate the invention, which is loaded onto the computer system.

The invention achieves several advantages. the invention quickens the physical deletion of data in the following novel ways. There is an instant shredding of data within a user specified time limit. Data objects are placed on disk systems to optimize read or write performance. For example, data is stripped across multiple disks (e.g., RAID 0) to improve read performance times. Generally, when data is initially stored, it is stored to improve READ performance. Subsequently, the data is moved and re-allocated on the disk to speed up delete performance. When this occurs is determined based on the data expiration policy. Thus, when data is stored initially, it is not optimized for delete performance. Only after the invention is applied to the stored data, is the data optimized for delete performance. Another feature of the invention is that encrypting the data using a key (salt) is only necessary when the system determines that it cannot delete the data within the prescribed time period. Hence, one does not have to encrypt the data using the salt all the time. Moreover, the invention provides a generalized approach which is adaptable to several different technologies and uses.

According to the invention data is placed on disks to optimize delete performance. Delete performance is optimized both for user's data as well as the metadata that describes the place of the user's data on the disk. The system constantly monitors user's data creation rate, and it proactively warns the user if it cannot delete data within the user specified tolerance window. For example, users might want all of their data to be physically removed from the disk within twenty-four hours of the expiration of the data retention time. The system places data to optimize read performance, but subsequently, it dynamically re-organizes the data to optimize delete performance when it gets closer to the data expiration time. If the data cannot be physically deleted in the user desired time window, then the system provides the user with an option to encrypt the data so that the data can be logically deleted upon the expiration of the data retention time, and then subsequently physically removed in a so-called "lazy" manner.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A method of optimizing data placement on a storage device, said method comprising:
    establishing a specified time constraint for which said storage device is to delete data stored thereon;
    dividing a data object into a plurality of data bits;
    programming a block of data and said data bits with a logic operand, if said storage device is incapable of deleting said data within said specified time constraint;
    creating an encoded block of data from the programmed block of data and said data bits;
    organizing said encoded block of data and said data bits in said storage device according to data deletion requirements;
    providing a user with an option to encrypt said data bits prior to removal of said data bits from said storage device when said data deletion requirements cannot be satisfied within said specified time constraint;
    removing said data bits from said storage device if said data bits are organized within a specified data deletion requirement;
    dynamically re-organizing said data bits when an expiration of said specified time constraint is nearly reached in order to optimize the removing process; and
    removing said data bits from said storage device upon the expiration of said specified time constraint if said data bits are encrypted.

2. The method of claim 1, wherein said data bits are removed using a data shredding process.

3. The method of claim 1, wherein said logic operand comprises an exclusive-or (XOR) operator.

4. The method of claim 3, further comprising restoring said data object by:
    retrieving said encoded block of data and said data bits from said storage device; and
    applying said logic operand to said encoded block of data and said data bits.

5. The method of claim 1, further comprising associating a piece of metadata with said data object to identify a correct block of data to be used to form said encoded block of data.

6. The method of claim 1, further comprising using idle cycles to rearrange said encoded block of data and said data bits prior to said step of removing.

7. The method of claim 1, further comprising determining whether said data deletion requirements can be satisfied.

8. A storage device comprising:
    an encoded block of data comprising a block of data and data bits;
    a data organizer operable for organizing said encoded block of data according to data deletion requirements;
    a system adapted to provide a user with an option to encrypt said data bits if said data bits cannot be physically deleted from said storage device within a user-defined specified data deletion time constraint;
    a data deletion component operable for removing said data bits from said storage device if said data bits are organized within a specified data deletion requirement, wherein said data deletion component is adapted to remove said data bits from said storage device upon the expiration of said specified time constraint if said data bits are encrypted,
    wherein said data organizer is operable for dynamically re-organizing said data bits when an expiration of said specified time constraint is nearly reached in order to optimize the removal of said data bits from said storage device.

9. The storage device of claim 8, wherein said data deletion component removes said data bits using a data shredding process.

10. The storage device of claim 8, wherein said block of data and said data bits are adapted to be programmed with a logic operand, and wherein said logic operand comprises an exclusive-or (XOR) operator.

11. The storage device of claim 10, further comprising a data restoration component.

12. The storage device of claim 8, wherein said data organizer is operable for determining whether said data deletion requirements can be satisfied.

13. The storage device of claim 8, wherein said data organizer is operable for informing a user whether said data deletion requirements cannot be satisfied.

14. A program storage device readable by computer, tangibly embodying a program of instructions executable by said computer to perform a method optimizing data placement on a storage disk said method comprising:
    establishing a specified time constraint for which said storage device is to delete data stored thereon;
    dividing a data object into a plurality of data bits;

programming a block of data and said data bits with a logic operand, if said storage device is incapable of deleting said data within said specified time constraint;

creating an encoded block of data from the programmed block of data and said data bits;

organizing said encoded block of data and said data bits in said storage device according to data deletion requirements;

providing a user with an option to encrypt said data bits prior to removal of said data bits from said storage device when said data deletion requirements cannot be satisfied within said specified time constraint;

removing said data bits from said storage device if said data bits are organized within a specified data deletion requirement;

dynamically re-organizing said data bits when an expiration of said specified time constraint is nearly reached in order to optimize the removing process; and removing said data bits from said storage device upon the expiration of said specified time constraint if said data bits are encrypted.

15. The program storage device of claim 14, wherein said data bits are removed using a data shredding process.

16. The program storage device of claim 14, wherein said logic operand comprises an exclusive-or (XOR) operator.

17. The program storage device of claim 16, further comprising restoring said data object by:

retrieving said encoded block of data and said data bits from said storage disk; and applying said logic operand to said encoded block of data and said data bits.

18. The program storage device of claim 14, further comprising associating a piece of metadata with said data object to identify a correct block of data to be used to form said encoded block of data.

19. The program storage device of claim 14, further comprising using idle cycles to rearrange said encoded block of data and said data bits prior to said step of removing.

20. The program storage device of claim 14, further comprising determining whether said data deletion requirements can be satisfied.

21. A method of optimizing data placement on a storage device, said method comprising:

establishing a specified time complaint for which said storage device is to delete data stored thereon;

dividing a data object into a plurality of data bits;

programming a block of data and said data bits with a logic operand, if said storage device is incapable of deleting said data within said specified time constraint;

creating an encoded block of data from the programmed block of data and said data bits;

associating a piece of metadata with said data object to identify a correct block of data to be used to form said encoded block of data;

organizing said encoded block of data and said data bits in said storage device according to data deletion requirements;

informing a user whether said data deletion requirements cannot be satisfied within said specified time constraint;

using idle cycles to rearrange said encoded block of data and said data bits;

using a shredding process to remove said data bits from said storage device if said data bits are organized within a specified data deletion requirement;

dynamically re-organizing said data bits when an expiration of said specified time constraint is nearly reached in order to optimize the removing process; and removing said data bits from said storage device upon the expiration of said specified time constraint if said data bits are encrypted.

* * * * *